United States Patent
Lundqvist et al.

(10) Patent No.: US 9,003,943 B2
(45) Date of Patent: Apr. 14, 2015

(54) OBJECT-FOCUSSED DECISION SUPPORT

(75) Inventors: Anders Lundqvist, Vaxholm (SE);
Vibeke Kensing, Vikingstad (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 14/358,602

(22) PCT Filed: Dec. 16, 2011

(86) PCT No.: PCT/SE2011/051533
§ 371 (c)(1),
(2), (4) Date: Jun. 18, 2014

(87) PCT Pub. No.: WO2013/089606
PCT Pub. Date: Jun. 20, 2013

(65) Prior Publication Data
US 2014/0373705 A1    Dec. 25, 2014

(51) Int. Cl.
*G01S 13/78* (2006.01)
*F41H 11/00* (2006.01)

(52) U.S. Cl.
CPC .............. *F41H 11/00* (2013.01); *G01S 13/78* (2013.01)

(58) Field of Classification Search
USPC ............... 89/1.11, 1.1; 244/3.1, 3.19; 342/13, 342/160, 89, 90; 701/5, 2
See application file for complete search history.

(56) References Cited

U.S. PATENT DOCUMENTS

| | | | |
|---|---|---|---|
| 5,343,212 A * | 8/1994 | Rose et al. | 342/424 |
| 5,457,466 A * | 10/1995 | Rose | 342/442 |
| 5,870,056 A * | 2/1999 | Fowler | 342/424 |
| 5,877,998 A * | 3/1999 | Aidala et al. | 367/124 |
| 6,244,536 B1 * | 6/2001 | Cloutier | 244/3.19 |
| 6,411,249 B1 * | 6/2002 | Rose | 342/13 |
| 6,521,430 B1 * | 2/2003 | Orwar et al. | 435/173.6 |
| 6,525,685 B1 * | 2/2003 | Rose | 342/148 |
| 6,535,158 B2 * | 3/2003 | Wilkerson et al. | 342/26 D |
| 6,714,155 B1 * | 3/2004 | Rose | 342/107 |
| 6,791,493 B1 * | 9/2004 | Rose | 342/442 |

(Continued)

OTHER PUBLICATIONS

International Searching Authority, International Search Report and Written Opinion for International Application No. PCT/SE2011/051533, Oct. 25, 2012, 10 pages, Swedish Patent and Registration Office, Sweden.

(Continued)

*Primary Examiner* — Michael David
(74) *Attorney, Agent, or Firm* — Alston & Bird LLP

(57) ABSTRACT

The invention relates to a method for decision support of a combat object (1) in a combat situation comprising the steps of: a) detecting (3) an enemy object (2) such that a plurality of characteristic parameters of the enemy object (2) is determined, b) calculating (4) at least one quality factor for at least one combat sensor of the combat object (1), wherein each quality factor is adapted for indicating identification ability of a combat sensor, and calculating (4) at least one signature factor for at least one enemy sensor of the enemy object (2) based on a predetermined model, wherein each signature factor is adapted for indicating identification ability of an enemy sensor, c) allocating (5) each quality factor calculated in the previous step b) to each combat sensor and allocating (5) each signature factor calculated in the previous step b) to each enemy sensor, and d) controlling (6) each combat sensor against the enemy object (2) based on the result of the previous step c). In this way, support for the pilot on a target-oriented basis is provided in order to make a quick and efficient decision in a combat situation.

10 Claims, 1 Drawing Sheet

(56) References Cited

U.S. PATENT DOCUMENTS

| | | | |
|---|---|---|---|
| 6,801,152 B1* | 10/2004 | Rose | 342/13 |
| 7,026,980 B1* | 4/2006 | Mavroudakis et al. | 342/90 |
| 7,081,849 B2* | 7/2006 | Collins et al. | 342/160 |
| 7,167,127 B2* | 1/2007 | Collins et al. | 342/160 |
| 7,256,729 B2* | 8/2007 | Bummerstede | 342/59 |
| 7,394,046 B2* | 7/2008 | Olsson et al. | 244/3.1 |
| 7,525,448 B1 | 4/2009 | Wilson et al. | |
| 7,764,217 B2* | 7/2010 | Yannone | 342/13 |
| 7,870,816 B1* | 1/2011 | Willingham et al. | 89/204 |
| 8,189,938 B2* | 5/2012 | Hohenberger et al. | 382/254 |
| 8,406,162 B2* | 3/2013 | Haupt et al. | 370/311 |
| 8,654,005 B2* | 2/2014 | Christopher et al. | 342/95 |
| 8,699,781 B1* | 4/2014 | Bold | 382/141 |
| 8,711,220 B2* | 4/2014 | Tiana | 348/144 |
| 8,896,480 B1* | 11/2014 | Wilson et al. | 342/26 B |
| 8,909,394 B2* | 12/2014 | Lundqvist et al. | 701/5 |
| 2005/0001759 A1* | 1/2005 | Khosla | 342/90 |
| 2005/0074970 A1* | 4/2005 | Serina et al. | 438/686 |
| 2009/0109082 A1 | 4/2009 | Rose | |
| 2009/0327542 A1* | 12/2009 | Lundqvist | 710/105 |
| 2014/0277852 A1* | 9/2014 | Lundqvist et al. | 701/2 |
| 2014/0288907 A1* | 9/2014 | Lundqvist et al. | 703/2 |

OTHER PUBLICATIONS

Zacco Sweden AB, SAAB AB's Response to the Oct. 25, 2012 Written Opinion of the International Searching Authority for International Application No. PCT/SE2011/051533, Oct. 10, 2013, 14 pages, Sweden.

International Preliminary Examining Authority, Written Opinion (Second) for International Application No. PCT/SE2011/051533, Feb. 12, 2014, 4 pages, Swedish Patent and Registration Office, Sweden.

International Preliminary Examining Authority, International Preliminary Report on Patentability, including SAAB AB's Mar. 4, 2014 Response to the International Preliminary Examining Authority's Feb. 12, 2014 Written Opinion, for International Application No. PCT/SE2011/051533, Apr. 15, 2014, 7 pages, Swedish Patent and Registration Office, Sweden.

\* cited by examiner

OBJECT-FOCUSSED DECISION SUPPORT

CROSS REFERENCE TO RELATED APPLICATIONS

This application is a National Stage Application, filed under 35 U.S.C. §371, of International Application No. PCT/SE2011/051533, filed Dec. 16, 2011; the contents of which is hereby incorporated by reference in its entirety.

BACKGROUND

1. Related Field

The invention relates to a method for decision support of a combat object in a combat situation.

2. Description of Related Art

Document U.S. Pat. No. 7,525,448 B1 describes an aircraft optical display system for implementing an enhanced vision system based on weather conditions. The display system includes a plurality of imaging sensors configured to receive imaging input data and generate image data, where each imaging sensor is associated with one or more weather conditions.

Highly developed functions for human machine interface, HMI for short, and decision support as support functions for the pilot environment in combat aircraft do already exist. All solutions are based on combat situations where HMI and decision support together describe a current position and display the tools and solutions to the pilot.

Existing solutions are based on the aircraft itself and its available resources and tools. Sensors, such as radar, are operated by the pilot as the tool for close-range scanning or for scanning objects for identification and continued pursuit. Decision support supports the multiple use of sensors by merging objects detected by several different sensors and coordinating and correlating these objects in a situation picture.

However, when the complexity increases because more tools and sensors are supplied, the possibilities available to the pilot to control his tools/sensors in time are limited and made difficult. In time-critical situations, for instance in air combat, the pilot risks becoming the underdog in combat because of this. Another limitation is the fact that each tool and/or sensor has its own characteristics and peculiarities. Each sensor and/or tool therefore requires its own interface and control functions which the pilot needs to be able to understand and use correctly.

BRIEF SUMMARY

It is the object of the invention to provide a possibility for assisting a pilot on a target-oriented basis in decision support in a combat situation.

This object is achieved by the subject matter of independent claim 1. Preferred embodiments are defined in the sub claims.

According to an aspect of the invention, this object is achieved by a method for decision support of a combat object in a combat situation comprising the steps of: a) detecting an enemy object such that a plurality of characteristic parameters of the enemy object is determined, b) calculating at least one quality factor for at least one combat sensor of the combat object, wherein each quality factor is adapted for indicating identification ability of a combat sensor, and calculating at least one signature factor for at least one enemy sensor of the enemy object based on a predetermined model, wherein each signature factor is adapted for indicating identification ability of an enemy sensor, c) allocating each quality factor calculated in the previous step b) to each combat sensor and allocating each signature factor calculated in the previous step b) to each enemy sensor, and d) controlling each combat sensor against the enemy object based on the result of the previous step c). Preferably, identification ability of the combat sensor comprises detection ability of the combat sensor and identification ability of the enemy sensor comprises detection ability of the enemy sensor, respectively.

It is an idea of the invention that based on the knowledge of the different, previously calculated and allocated, signature factors of the enemy sensors and different quality factors of the own combat sensors, the positions of the own combat object and of the enemy object are determined. It is not necessary to go for the optimum in the controlling step d) since a trade-off between increasing the quality factor and decreasing the signature factor is already adequate, wherein both factors are independent from each other. According to other preferred embodiments of the invention the optimum is searched.

It is a further idea of the invention to use the radar principle with main and side lobes such that one can determine strong and weak points in the system. In order to serve as a decision support tool the aspect angle of the combat sensor and/or the emission control is/are changed such that the mode in the combat aircraft is adjustable. Preferably, the results are integrated over time. In this way, a matrix of predefined lists is obtained, wherein the combinations can be used in order to get discrete decisions and their number corresponds to a predefined number of possibilities. Hence, the sensors of the combat aircraft are not controlled by the pilot but on the basis of the expected enemy aircraft. Two parameters, quality Q and signature S, are introduced for sensor control. Q refers to sensor quality, in particular to the own sensor quality, when detecting an enemy object and S refers to the signature, in particular to the own signature, exposed to the same enemy object and its sensors, wherein the sensors can be assumed. It is thus an idea of the invention to provide a decision support system which evaluates detected and assumed objects in the situation picture and adapts the sensors of a pilot's own aircraft to these objects on the basis of Q and S. The assumptions are typically based on the current reports for the area or from expectation based on typical behaviour and doctrine. The purpose is to shift the focus to the detected and measured objects in order to perform the tasks needed on a target-oriented basis and not by micro-handling tools and/or sensors.

According to a preferred embodiment of the invention, the combat object comprises a combat aircraft and/or a combat station and the enemy object comprises at least one of an enemy combat aircraft, an enemy station and an obstacle, such as a mountain or a cloud. The plurality of characteristic parameters of the enemy object preferably comprise type, position, velocity and/or aspect angle. Preferably, the predetermined model in step b) comprises the characteristics of the at least one enemy sensor, an atmospheric model and/or a condition model. The atmospheric model preferably comprises a plurality of atmospheric parameters such as wind speed, rain, humidity, fog and/or clouds. The condition model is preferably frequency dependent and comprises at least one of a visual and an infrared frequency spectrum.

According to a preferred embodiment of the invention, the method further comprises the step of storing the at least one quality factor for the at least one combat sensor and storing the at least one signature factor for the at least one enemy sensor.

According to a preferred embodiment of the invention, the method further comprises the step of displaying the at least one quality factor for the at least one combat sensor and displaying the at least one signature factor for the at least one enemy sensor.

According to a preferred embodiment of the invention, the method further comprises the step of recording each quality factor out of a plurality of quality factors and each signature factor out of a plurality of signature factors, wherein the recorded data is adapted for generating a situation picture which is adapted for decision support of the combat object in the combat situation. The controlling step d) is preferably adapted for decision support of the combat object such that the combat object adjusts its appearance in the combat situation.

BRIEF DESCRIPTION OF THE FIGURES

These and other aspects of the invention will be apparent from and elucidated with reference to the embodiments described hereinafter.

In the drawings.

DETAILED DESCRIPTION OF VARIOUS EMBODIMENTS

Figure 1:
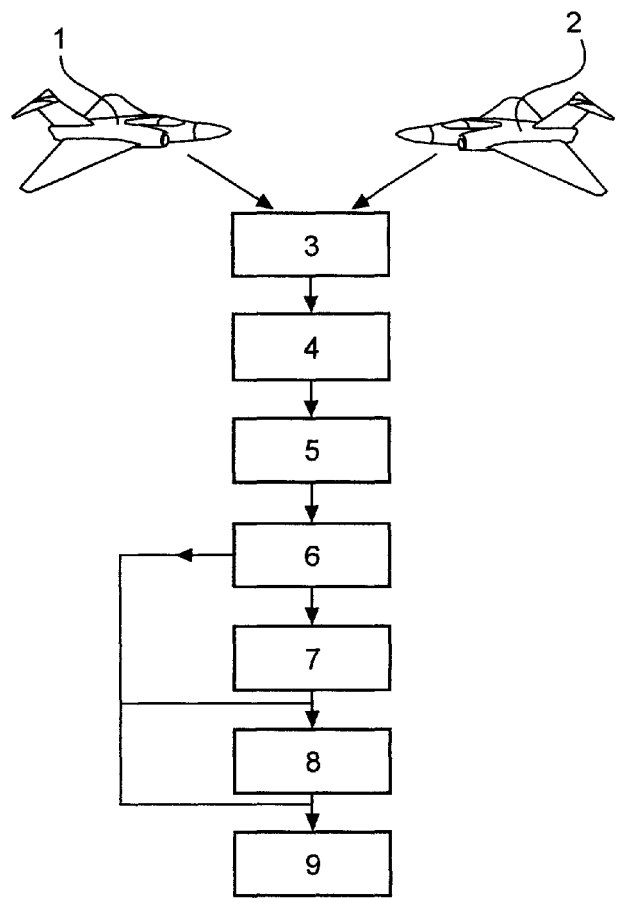
FIG. 1 illustrates the steps of a method for decision support of a combat object in a combat situation according to a preferred embodiment of the invention.

FIG. 1 shows the steps of a method for decision support of a combat object 1 according to a preferred embodiment of the invention. Firstly, an enemy object 2 is detected 3 such that a few characteristic parameters of the enemy object 2 are determined. Secondly, at least one quality factor for at least one combat sensor of the combat object 1 is calculated 4, wherein each quality factor is adapted for indicating identification ability of a combat sensor, and further at least one signature factor for at least one enemy sensor of the enemy object 2 is calculated 4 based on a predetermined model, wherein each signature factor is adapted for indicating identification ability of an enemy sensor. Thirdly, each quality factor calculated in the previous step is allocated 5 to each combat sensor and each signature factor calculated in the previous step is allocated 5 to each enemy sensor, and, finally, each combat sensor is controlled 6 against the enemy object 2 based on the result of the previous step. In addition, the method can further comprise the steps of storing 7 the at least one quality factor for the at least one combat sensor and storing 7 the at least one signature factor for the at least one enemy sensor and further displaying 8 the quality factor and the at least one signature factor. The method can comprise the further step of recording 9 each quality factor and each signature factor, wherein the recorded data is adapted for generating a situation picture which is adapted for decision support of the combat object 1 in the combat situation.

Figure 2:
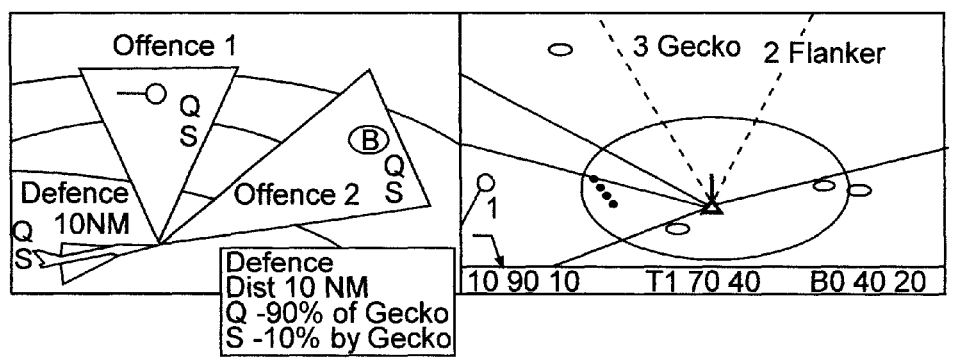
FIG. 2 schematically shows the decision support system controlling the sensors on the basis of an analysis of the objects which are to be detected according to another preferred embodiment of the invention.

FIG. 2 shows a decision support system controlling the sensors on the basis of an analysis of the enemy objects that have been detected according to another preferred embodiment of the invention. Two incorporated parameters are assessed for each combat sensor. Q describes the ability of the combat sensor to detect, pursue or identify an enemy object based on the quality indication for the current situation. S describes the revealing and/or identification ability of the combat sensor relative to an indicated enemy object in the current situation and is indicated as "S" in FIG. 2. According to this preferred embodiment of the invention, S comprises active emission and passive reflection of active signals, such as those from radar. A current situation refers to the mutual spatial positions and vectors, such as position, height and speed, and climatic zone or atmosphere conditions for the combat aircraft or enemy object as well as any obstacles in the topography, such as intervening mountains and hills that can be displayed in the visual and/or IR frequency spectrum, for instance, or weather and/or topography situations, such as clouds or forests. The current situation is described by models, such as the atmospheric model, the condition model for one's own aircraft or the condition model for the enemy aircraft. In this way, Q and S are coordinated in the decision support system which then generates a plurality of control orders that are sent to the respective sensors. According to other preferred embodiments of the invention, the model comprises a jamming situation, for instance enemy radar jamming.

Therefore, the pilot's focus is shifted from handling sensors to tactically working with objects in the situation picture which makes the pilot object-focused instead of tool-focused. In this way, sensors can be controlled automatically so that objects can be detected to the optimum degree without revealing the combat aircraft.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously.

The invention claimed is:

1. A method for decision support of a combat object (1) in a combat situation comprising the steps of:
   a) detecting (3) an enemy object (2) comprising at least one of an enemy combat aircraft or an enemy station, such that a plurality of characteristic parameters of the enemy object (2) is determined,
   b) calculating (4) at least one quality factor for at least one combat sensor of the combat object (1), the quality factor referring to own sensor quality, when detecting an enemy object (2), wherein each quality factor is configured for indicating identification ability of a combat sensor, and calculating (4) at least one signature factor for at least one enemy sensor of the enemy object (2) based on a predetermined model, the signature factor referring to own signature, exposed to the same enemy object and its sensors, wherein each signature factor is configured for indicating identification ability of an enemy sensor,
   c) allocating (5) each quality factor calculated in the previous step b) to each combat sensor and allocating (5) each signature factor calculated in the previous step b) to each enemy sensor, and
   d) controlling (6) each combat sensor against the enemy object (2) based on the result of the previous step c), wherein the controlling is configured for decision support of the combat object (1) such that the combat object (1) adjusts its appearance in the combat situation, by a trade-off between increasing the quality factor and decreasing the signature factor, without revealing the combat object (1).

2. The method according to claim 1, wherein the combat object (1) comprises at least one of a combat aircraft or a combat station.

3. The method according to claim 1, wherein the plurality of characteristic parameters of the enemy object (2) comprise at least one of a type, a position, a velocity or an aspect angle.

4. The method according to claim 1, wherein the predetermined model in step b) comprises the characteristics of the at least one enemy sensor, an atmospheric model and/or a condition model.

5. The method according to claim 4, wherein the atmospheric model comprises a plurality of atmospheric parameters.

6. The method according to claim 5, wherein the plurality of atmospheric parameters comprise at least one of wind speed, rain, humidity, fog, or clouds.

7. The method according to claim 4, wherein the condition model is frequency dependent and comprises at least one of a visual frequency spectrum or an infrared frequency spectrum.

8. The method according to claim 1, further comprising the step of storing (7) the at least one quality factor for the at least one combat sensor and storing (7) the at least one signature factor for the at least one enemy sensor.

9. The method according to claim 1, further comprising the step of displaying (8) the at least one quality factor for the at least one combat sensor and displaying (8) the at least one signature factor for the at least one enemy sensor.

10. The method according to claim 1, further comprising the step of recording (9) each quality factor out of a plurality of quality factors and each signature factor out of a plurality of signature factors, wherein the recorded data is configured for generating a situation picture which is configured for decision support of the combat object (1) in the combat situation.

* * * * *